US008567797B2

(12) United States Patent
Westphal

(10) Patent No.: US 8,567,797 B2
(45) Date of Patent: Oct. 29, 2013

(54) WHEELBARROW

(76) Inventor: Friedrich Westphal, Sasbach (DE)

( * ) Notice: Subject to any disclaimer, the term of this patent is extended or adjusted under 35 U.S.C. 154(b) by 0 days.

(21) Appl. No.: 13/378,803

(22) PCT Filed: Mar. 1, 2011

(86) PCT No.: PCT/DE2011/000199
§ 371 (c)(1), (2), (4) Date: Dec. 16, 2011

(87) PCT Pub. No.: WO2011/107073
PCT Pub. Date: Sep. 9, 2011

(65) Prior Publication Data
US 2012/0319370 A1    Dec. 20, 2012

(30) Foreign Application Priority Data
Mar. 1, 2010    (DE) .......................... 10 2010 009 771

(51) Int. Cl.
*B62B 1/18*    (2006.01)
(52) U.S. Cl.
USPC ....................................... 280/47.31; 280/653
(58) Field of Classification Search
USPC ........ 280/652, 653, 654, 47.131, 47.3, 47.31, 280/47.32, 78
See application file for complete search history.

(56) References Cited

U.S. PATENT DOCUMENTS

| | | | |
|---|---|---|---|
| 3,404,427 A | | 10/1968 | Mack |
| 5,153,966 A | * | 10/1992 | Godwin ........................ 16/421 |
| 5,253,890 A | * | 10/1993 | Takamiya et al. .......... 280/281.1 |
| 7,316,413 B2 | * | 1/2008 | Beaudoin ...................... 280/653 |
| 7,651,110 B2 | * | 1/2010 | Davis et al. ................ 280/281.1 |
| 2005/0275176 A1 | | 12/2005 | Jessop |
| 2007/0007738 A1 | * | 1/2007 | Albert ........................ 280/47.31 |

FOREIGN PATENT DOCUMENTS

| | | |
|---|---|---|
| DE | 324 243 | 8/1920 |
| DE | 20 2008 004 364 | 7/2008 |
| DE | 10 2007 000 127 | 9/2008 |
| FR | 2 151 708 | 4/1973 |
| FR | 2 614 861 | 11/1988 |
| GB | 810467 | 3/1959 |
| GB | 2 038 723 | 7/1980 |
| GB | 2 282 098 | 3/1995 |

OTHER PUBLICATIONS

International Search Report of PCT/DE2011/000199, date of mailing Aug. 2, 2011.
German Patent Office Search Report dated Oct. 5, 2010, with translation of relevant parts.

* cited by examiner

*Primary Examiner* — John Walters
(74) *Attorney, Agent, or Firm* — Collard & Roe, P.C.

(57) ABSTRACT

A wheelbarrow is proposed with a frame (1) formed from at least one hollow body (3), with at least one pivot-mounted wheel on the frame (1), with at least two handle bars (5) with grips (6) for the frame located on the handle bars (5), with at least two supports (7) for the frame on which the wheelbarrow is supported in the rest position, with a load-carrying facility (2) of load-carrying shape located on the frame (1), with a differing cross-section of the hollow body (3) in various sections of the frame (1) and an oval external shape of the hollow body (3) departing from a circular shape for the cross-section of at least one straight section (5) of the frame (1).

16 Claims, 22 Drawing Sheets

WHEELBARROW

CROSS REFERENCE TO RELATED APPLICATIONS

Figure 1:
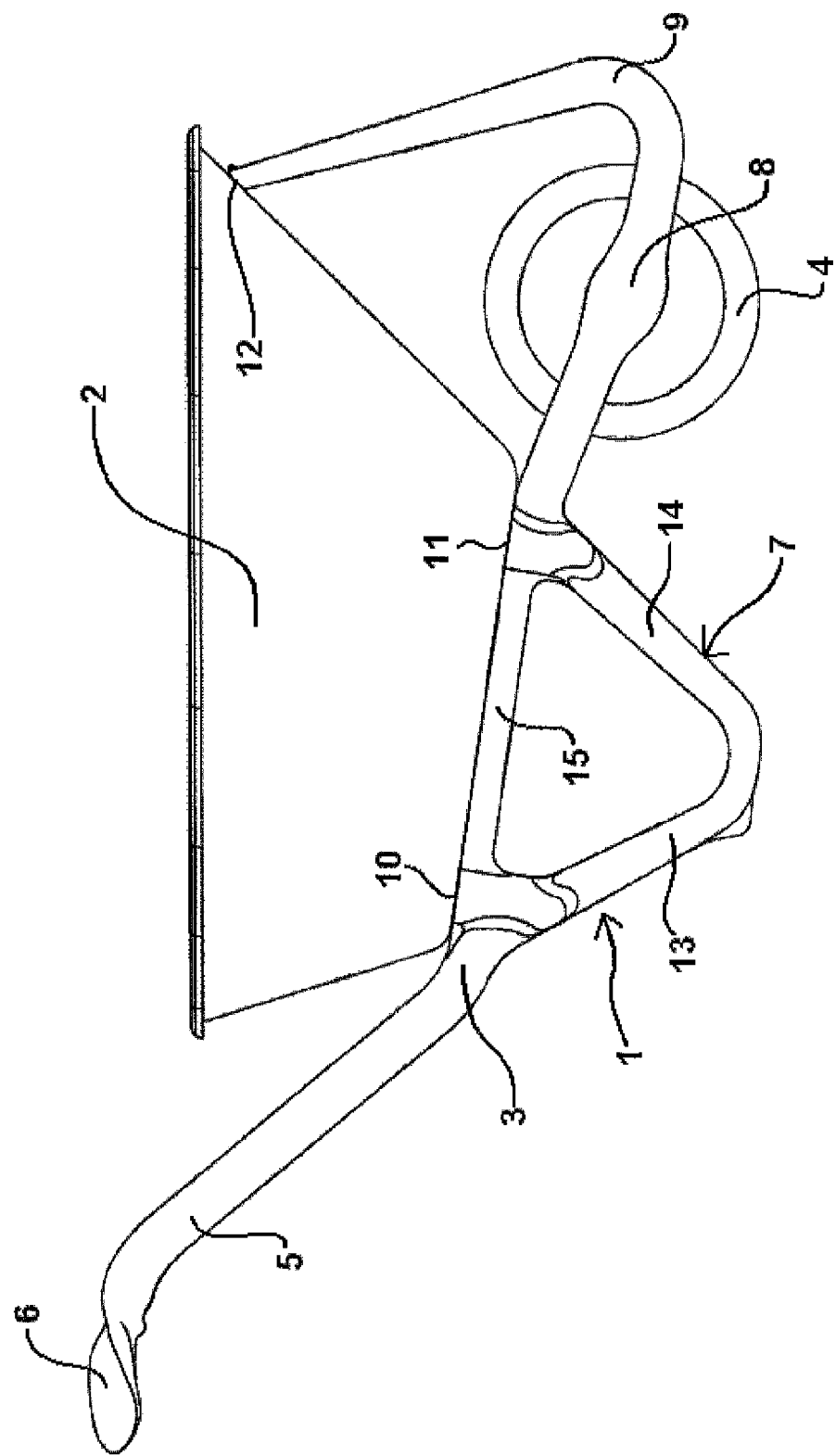

This application is the National Stage of PCT/DE2011/000199 filed on Mar. 1, 2011, which claims priority under 35 U.S.C. §119 of German Application No. 10 2010 009 771.3 filed on Mar. 1, 2010, the disclosure of which is incorporated by reference. The international application under PCT article 21(2) was not published in English.

The invention relates to a wheelbarrow with a frame with at least one wheel and with a load-carrying facility for the carrying of loads.

Known wheelbarrows exhibit a frame on which a wheel and a carrying facility for loads are located. The load-carrying facility usually consists of a trough-shaped container or another hollow body. The frame is equipped with two supports which, together with the wheel, support the wheelbarrow on a surface in the rest position. The frame furthermore exhibits two handle bars to allow the wheelbarrow's supports to be raised from the ground in order to change from the rest position to the travel position. In the travel position, only the wheel is in contact with the ground surface. The shape of the load carrier influences the position of the centre of gravity when the wheelbarrow is laden. The centre of gravity is preferably close to the wheel, so that only a small torque need be applied to raise the supports.

On known wheelbarrows, the frame ordinarily consists of a tube that is given the required shape for the frame. The tube is mostly made from metal. It is bent in order to give it the shape comprising the handle bars, the supports and the wheel mount. It is disadvantageous that the metal tube is not adjusted to different stability requirements for the various sections of the frame. The frame moreover exhibits a high weight and is complex to manufacture.

THE INVENTION AND ITS ADVANTAGES

The wheelbarrow according to the invention, with the features of claim 1, is characterised in that the frame is formed from at least one elongate hollow body that exhibits differing cross-sections for various sections. The external shape of the cross-section is oval, not circular, in at least one straight section. This is the cross-section of the hollow body, perpendicular to the longitudinal direction of the hollow body. The hollow body exhibits the shape of a tube with several curvatures. This tube determines a longitudinal direction in the various sections. The external shape of the cross-section refers to the outward-facing side of the wall of the hollow body. The differing cross-section of the hollow body in the various sections of the frame results alternatively or cumulatively from varying cross-section shapes or varying wall thicknesses. The oval shape, differing from a circular shape, provides greater stability, particularly if the elongation in the vertical direction is greater than in the horizontal direction. In addition, the cross-section of the hollow body in the various sections is matched to the differing requirements with regard to stability and weight load. Sections in which particularly high forces act exhibit a higher wall thickness than sections in which lower forces occur. The hollow body of the frame is thus optimally matched to the specific requirements. Because the wall thickness is greater only in those sections in which high forces occur, material can be saved in those sections in which lower forces occur. This means that the frame can exhibit lower weight combined with greater stability, compared to known wheelbarrows. The frame furthermore achieves adequate torsional rigidity.

The hollow body of the frame may for example be made from plastic and manufactured by means of fluid injection technology. The hollow body may further consist of a metal tube that is given the desired shape by means of hydroforming. Both materials and methods are suitable for the manufacture of large numbers of frames. They permit the production of hollow bodies with curvatures required for a frame, with varying cross-sections in various sections, and with an oval outer contour.

According to an advantageous embodiment of the invention, the oval external shape of the hollow body exhibits greater elongation in the vertical direction than in the horizontal direction in at least one section. This shape ensures that the frame is particularly stable in respect of weight forces from loads located in the load-carrying facility. These weight-forces act in the vertical direction.

According to a further advantageous embodiment of the invention, the wall thicknesses of the hollow body is different in various straight sections of the frame. In sections in which high forces act when the load-carrying facility is filled, the wall thickness is preferably higher than in sections which are subject to lower forces. This ensures higher stability of the wheelbarrow.

According to a further advantageous embodiment of the invention, the hollow body exhibits a curvature in at least one section. The wall thickness of the hollow body in the inward-facing part of the curvature is smaller than in the outward-facing part. This ensures that higher forces act on the outward-facing part and that greater stability is therefore required than in the inner-facing part. Such a curvature is envisaged for example in the section of the supports. The outward-facing part faces the ground surface in the rest position. It is therefore exposed to a higher mechanical load because of friction, particularly when the wheelbarrow is set down and when the wheelbarrow is moved in relation to the ground surface, if the wheelbarrow is not fully raised off its supports. Abrasion occurring as a result of high frictional forces does not significantly damage the wheelbarrow thanks to the greater wall thickness in this section, as there is sufficient material in the hollow body in this section.

According to a further advantageous embodiment of the invention, the hollow body of the frame exhibits a curvature in the section of the supports. The hollow body in the outward-facing outer side of the curvature and downward-facing outer side in the rest position of the wheelbarrow exhibits several ribs, which protrude above the surface surrounding the ribs. On the outer side of the curvature facing the ground, the hollow body is equipped with a reinforcement. It may for example consist of several ribs or ridges protruding above the surface surrounding the ribs. In the rest position, the supports consequently make contact with the ground over a smaller surface than a surface without ribs. The ribs furthermore increase the stability of the supports in the section set down on the ground in the rest position. By way of reinforcements, additional pins or plates may also be provided on the outer side of the curvature that protrude above the surface of the hollow body and are connected to the hollow body by means of a plug-in, screw or bonded connection. These additional reinforcing elements may be exchanged if worn.

According to a further advantageous embodiment of the invention, the frame exhibits two identical hollow bodies, each with a handle bar with grip, a support and a wheel mount on which the wheel is pivot-mounted. The two identical hollow bodies simplify manufacturing. The two hollow bodies may be connected to each other either by only the load-carrying facility or by additional connecting elements.

According to a further advantageous embodiment of the invention, at the opposite end to the handle bar each of the two identical hollow bodies exhibits a front connecting device at which the load-carrying facility is connected to the frame. If the load-carrying facility is a trough-shaped container, the container is connected to the frame at the forward-facing wall in the wheelbarrow's direction of travel. Each of the hollow bodies exhibits a section shaped as a roll-off bar between the wheel mount and the front connecting device, to facilitate tipping of the contents of the load-carrying facility. The two roll-off bars on the wheelbarrow run in a broadly vertical direction on both sides of the wheel. When tipping, the wheelbarrow is tilted forwards about the wheel. During this process the weight is transferred from the wheel to the two roll-off bars. Because the wheelbarrow is supported on two roll-off bars, undesirable toppling of the wheelbarrow sideways can be prevented. The two roll-off bars may furthermore be used to set down the wheelbarrow up-ended when not in use.

According to a further advantageous embodiment of the invention, each of the two identical hollow bodies exhibits a rear connecting device between the handle bar and the support, at which the load-carrying facility is connected to the frame. If the load-carrying facility is a trough-shaped container, the container is connected to the frame at its rear-facing wall in the wheelbarrow's direction of travel or at its downward-facing base.

According to a further advantageous embodiment of the invention, each of the two identical hollow bodies exhibits a centre connecting device between the support and the wheel mount, at which the load-carrying facility is connected to the frame. In the preferred form, both hollow bodies are connected to the load carrier at several points. This ensures higher stability of the wheelbarrow.

According to a further advantageous embodiment of the invention, the connecting device takes the form of a section of the hollow body. In this section, the hollow body exhibits a greater support surface for the load-carrying facility than the other sections of the hollow body. The load carrier may thus support itself on the hollow bodies over a greater area. The weight force of a filled load-carrying facility is thus transferred to the frame over a greater area. The force is distributed rather than acting on specific points. This ensures greater stability of the wheelbarrow.

According to a further advantageous embodiment of the invention, the section of the connecting device an the side facing the load-carrying facility exhibits elevations and/or recesses. The load-carrying facility in turn exhibits elevations and/or recesses in the area facing the connecting device that engage in the elevations and/or recesses of the connecting device. This produces interlocking of the connecting device and the load-carrying facility. This interlocking is able to absorb and compensate for forces acting not just downwards, but also sideways. In the preferred form, the elevations and/or recesses have a conical shape. Under the effect of the weight force of a filled load-carrying facility, the elevations and recesses of the connecting device and load-carrying facility interlock particularly effectively. With regard to mounting the load-carrying facility on the frame, the conical shape of the elevations and recesses results in the precise positioning of the load-carrying facility on the frame, without special tools being required for this. The conical shape of the elevations and recesses furthermore reduces or compensates for flow of material of the frame and load-carrying facility under high forces. Securing of the load-carrying facility to the frame by means of additional fastenings as well as elevations and recesses increases the wheelbarrow's stability and torsional rigidity.

Securing of the load-carrying facility to the frame in particular around the connecting devices may for example take the form of a snap-fit or detent connection, with which a section of the load-carrying facility engages or snaps into a section of the frame, particularly the connecting devices of the frame. Alternatively or cumulatively, additional fastenings such as screws, rivets or pegs may be used.

According to a further advantageous embodiment of the invention, the supports take the form of V-shaped sections of the at least one hollow body. The angle between the two shanks of each V-shaped section is preferably between 40° and 80°.

According to a further advantageous embodiment of the invention, the two shanks of each V-shaped section are connected to each other by a member forming a triangle together with the shanks. The member provides extra stability because it absorbs forces that act from above on the V-shaped section and exhibit the tendency to increase the angle of opening of the V-shaped section. The member may take the form of a hollow body or a profile without a cavity. It may take the form of an additional support surface for the load-carrying facility. To that end the member may exhibit a flat surface that faces the load-carrying facility and on which the load-carrying facility rests. The member may for example exhibit an L or U-shaped cross-section.

According to a further advantageous embodiment of the invention, the wheel mount takes the form of a section of the at least one hollow body. The cross-section of the section for the wheel mount is larger than the cross-sections of the adjacent sections. The section for the wheel mount exhibits a mount for a fixed or pivoting axle for the wheel. The mount may for example take the form of a cylindrical stub that stands away from the hollow body in the direction of the wheel. The axle of the wheel is inserted in the cylindrical stub. The axle is thus held on two sides by the mounts on the hollow bodies. Thanks to the wider cross-section of the hollow body in the section for the wheel mount, there is sufficient space for mounting the axle.

According to a further advantageous embodiment of the invention, the section for the wheel mount exhibits reinforcing elements taking the form of ribs or ridges. These protrude radially or at least in a ray pattern out from the axle mount or are inclined at an angle opposite the radial direction. They furthermore protrude above the adjacent surface of the hollow bodies on the side of the hollow bodies facing the wheel. In each case two adjacent ribs or ridges form two sides of a triangle. The more ribs or ridges are present, the greater the stability of the hollow bodies in the section for the wheel mount. A greater wall thickness of the hollow bodies can in addition produce high stability.

According to a further advantageous embodiment of the invention, the grips take the form of sections of the at least one hollow body in the area of the handles. The grips feature a grip recess for the thumb and/or a grip recess for a further finger, for example the index finger. The grips are ergonomically shaped and match the hand of a user. The surface of the grips is as large as possible, so that they sit comfortably in the hand. The grip recesses for the thumb and/or a further finger ensure that the grip can be held securely in the hand of a user, and that the grip cannot easily slip out of the hand. Furthermore, the surface of the grips may be given a special structure or finished with a special material to improve its feel and increase the friction between the hand of a user and the grip.

According to a further advantageous embodiment of the invention, the load-carrying facility exhibits at least one elongate cavity in the form of a stiffening element. If the load-carrying facility is for example a trough-shaped container, several open or enclosed channels may be provided on the outer-facing side of the container. These may for example run in a straight line along or close to the edges. The square base of a trough-shaped container may for example feature two diagonally-running channels that cross over. These provide torsional stability. To increase stability under forces occurring when the wheelbarrow is tipped sideways, additional cavities may be provided on the load-carrying facility around the connecting device, between the frame and the load-carrying facility.

According to a further advantageous embodiment of the invention, there are reinforcing elements integrated into the load-carrying facility. These may in particular be included in the wall sections and/or the base of the load-carrying facility during its manufacture. They may take the form of ribs or ridges and protrude above the outward-facing surface of the load-carrying facility. Furthermore, they may be embedded in the material of the load-carrying facility in such a way that they are not visible from outside. Such embedded reinforcing elements may also be made from a different material to the load-carrying facility. Unlike the stiffening elements, the reinforcing elements do not exhibit a cavity. They may run for example along the edges of the load-carrying facility like the stiffening elements described above, or may be arranged cross-wise. They may extend for example from one fixing zone of the load carrier to the frame to another fixing zone.

According to a further advantageous embodiment of the invention, additional reinforcing or stiffening elements may be arranged on the load-carrying facility's frame during assembly of the wheelbarrow. These may be for example metal or plastic profiles.

For additional stabilisation of the wheelbarrow, sections may be provided on the frame, for example on the handle bars or between the handle bars and the supports, which protrude in the direction of the load-carrying facility and which are connected with the load-carrying facility by means of fastenings such as screws.

According to a further advantageous embodiment of the invention, the load-carrying facility exhibits a structure comprising several layers at least in certain sections. The layers may be made from identical or differing materials. Their thickness may be identical or may vary. One of the layers may for example consist of fibres, wires or threads that are connected together in the form of a woven or knitted fabric.

According to a further advantageous embodiment of the invention, the load-carrying facility exhibits a foamed material. This may in particular be a foamed plastic. Foam structures made from plastic are for example produced by an injection moulding manufacturing process involving the addition of blowing agent to the plastic melt. Nitrogen may furthermore be injected into the hot plastic melt. The foamed material reduces the weight of the load-carrying facility without impairing its stability. Its strength may even be increased. If the load-carrying facility exhibits a structure made from several layers, one of the layers may for example be a foamed material.

According to a further advantageous embodiment of the invention, the frame is made from plastic. The corresponding hollow body or bodies can be manufactured by means of fluid injection technology. For this, plastic melt is introduced into the cavity of an injection-moulding tool and a fluid introduced to produce a cavity in the still-liquid melt. It is possible to manufacture the hollow bodies from two separate components: a first component forming the inside of the hollow body, and a second component forming the outside.

Further advantages and advantageous embodiments of the invention are given in the following description, the drawing and the claims.

DRAWING

Figure 2:
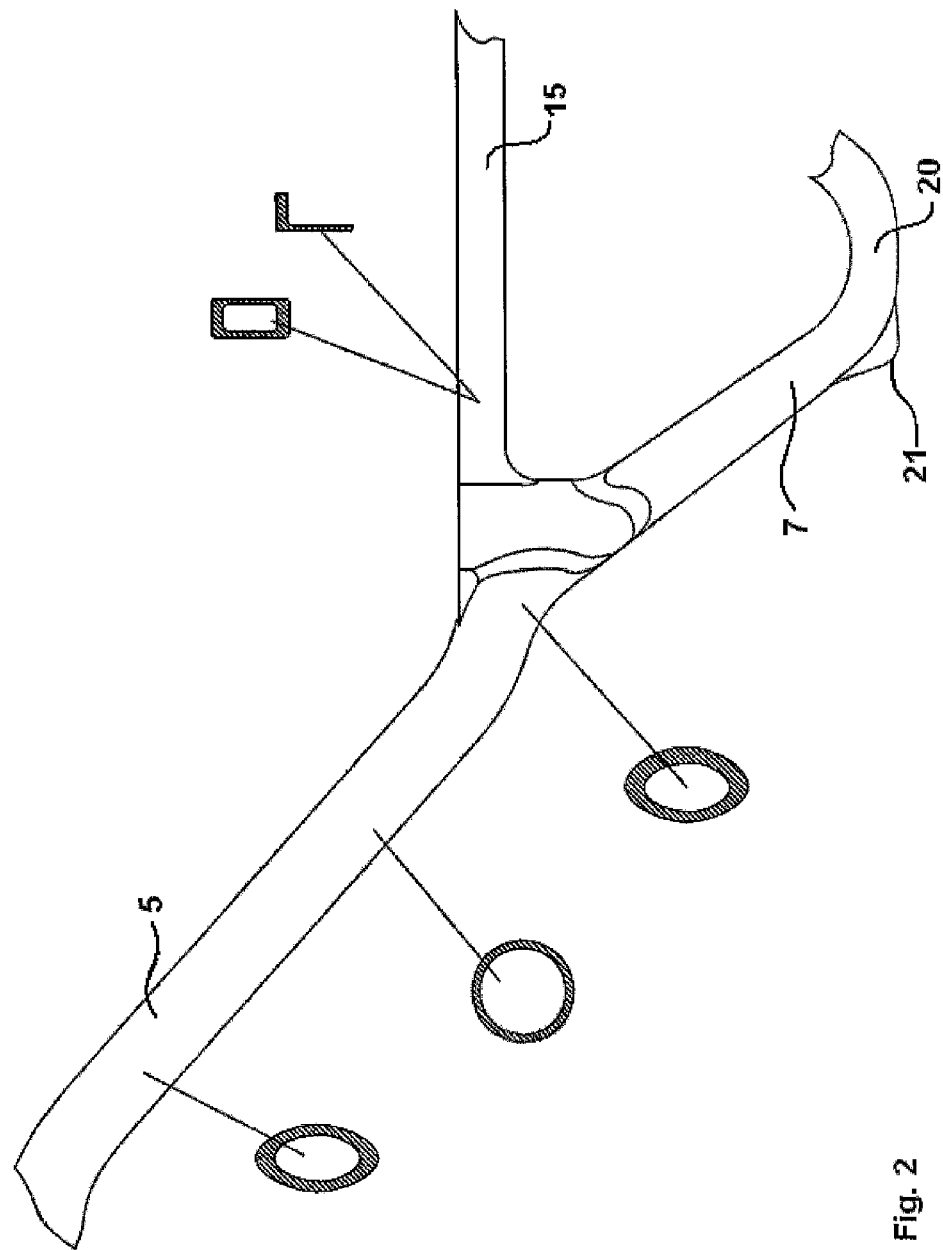
Figure 3:
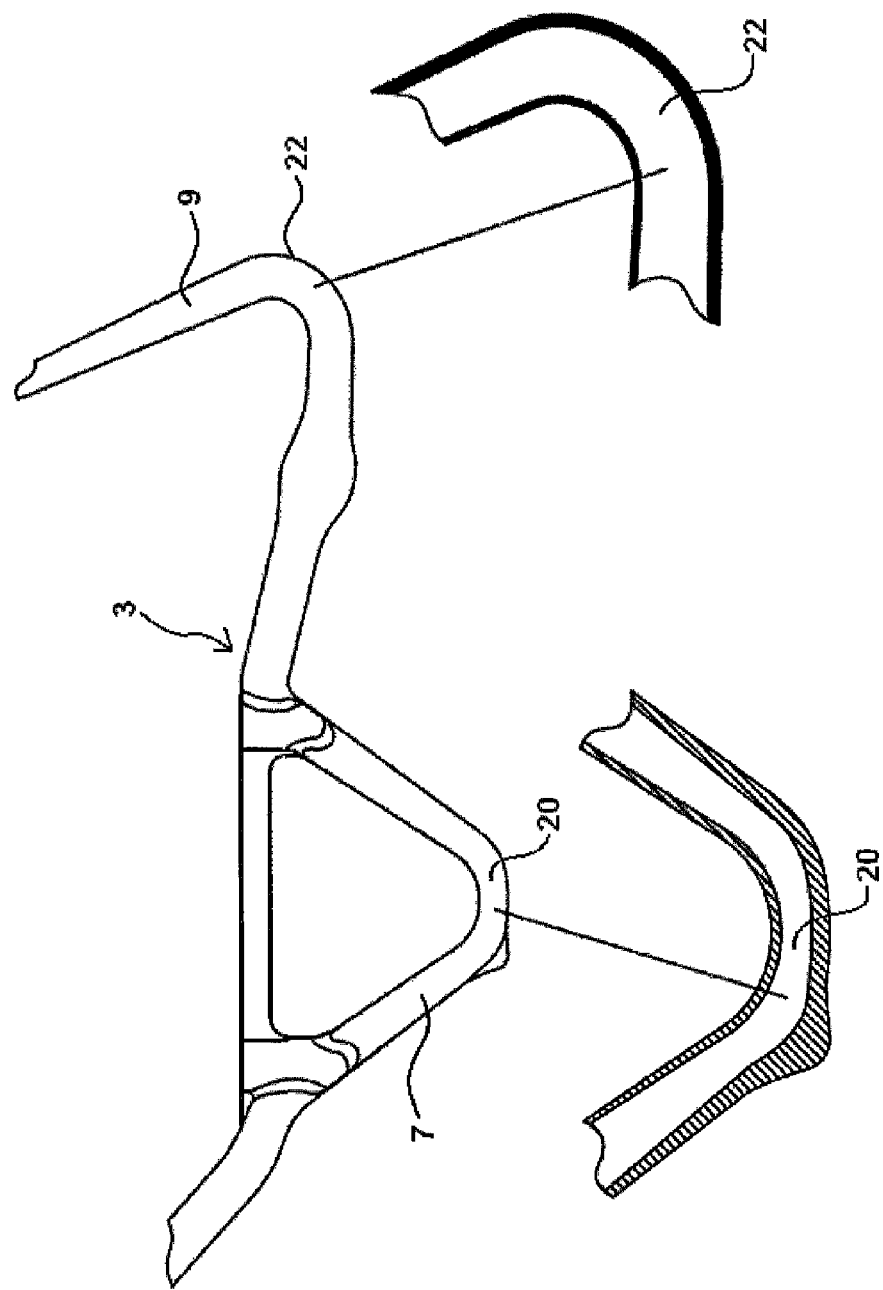
Figure 4:
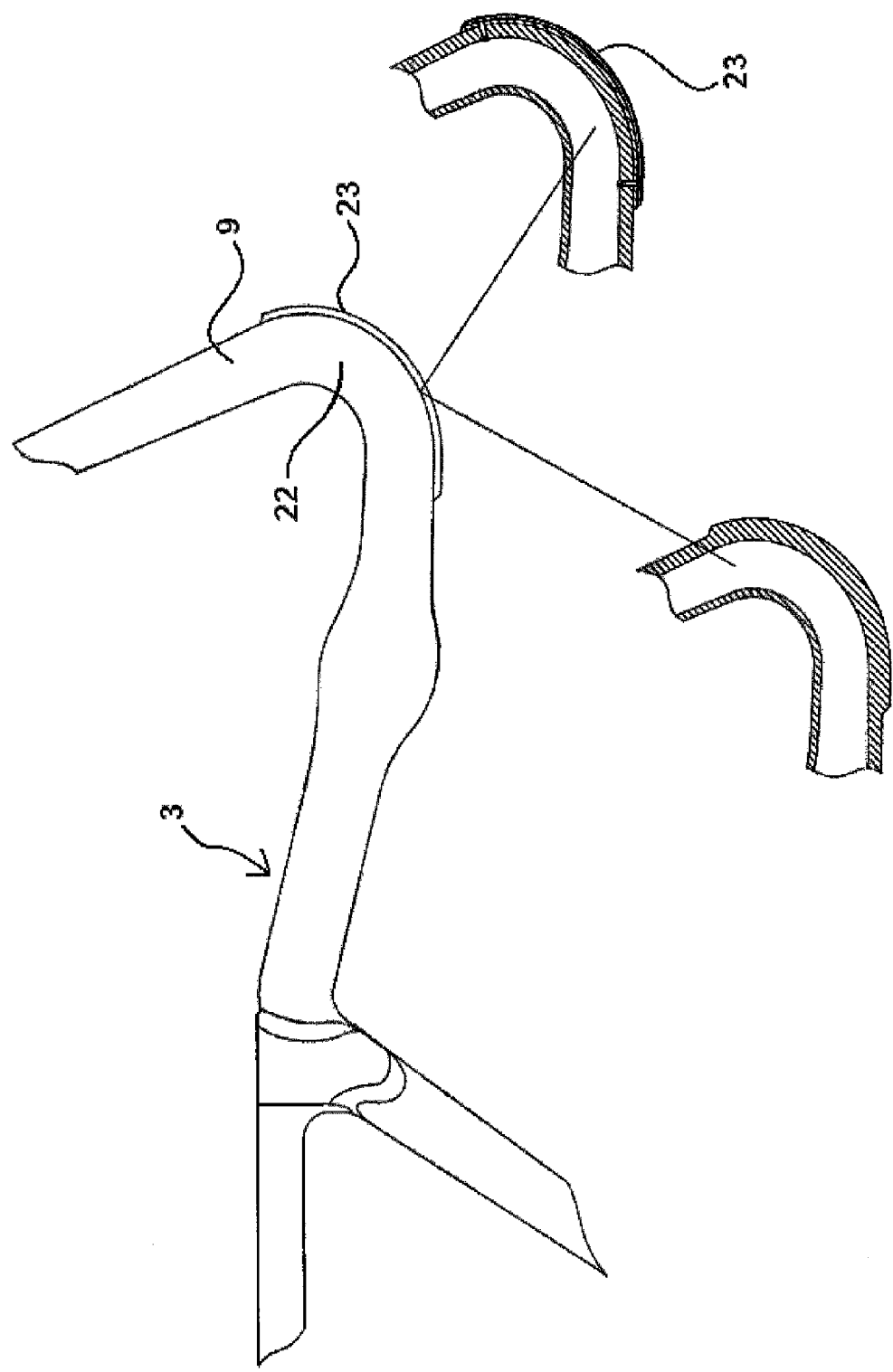
Figure 5:
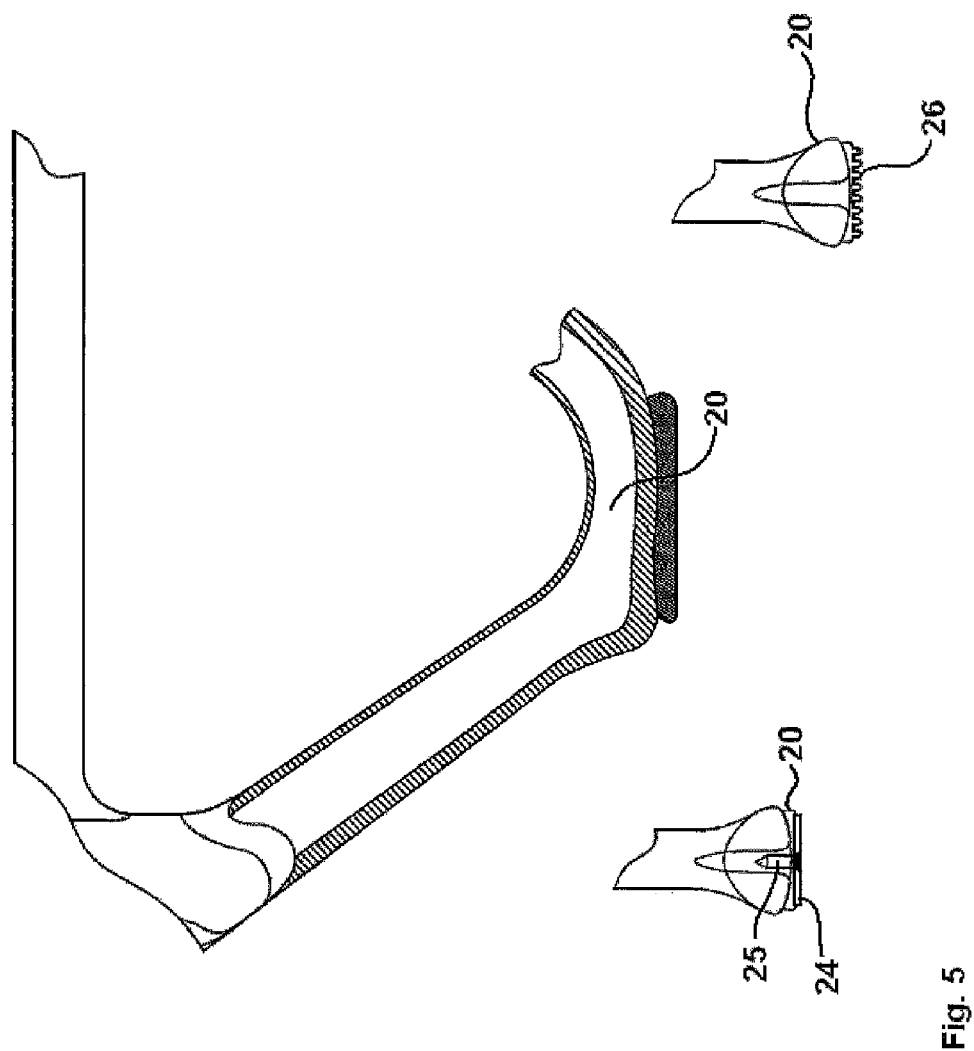
Figure 6:
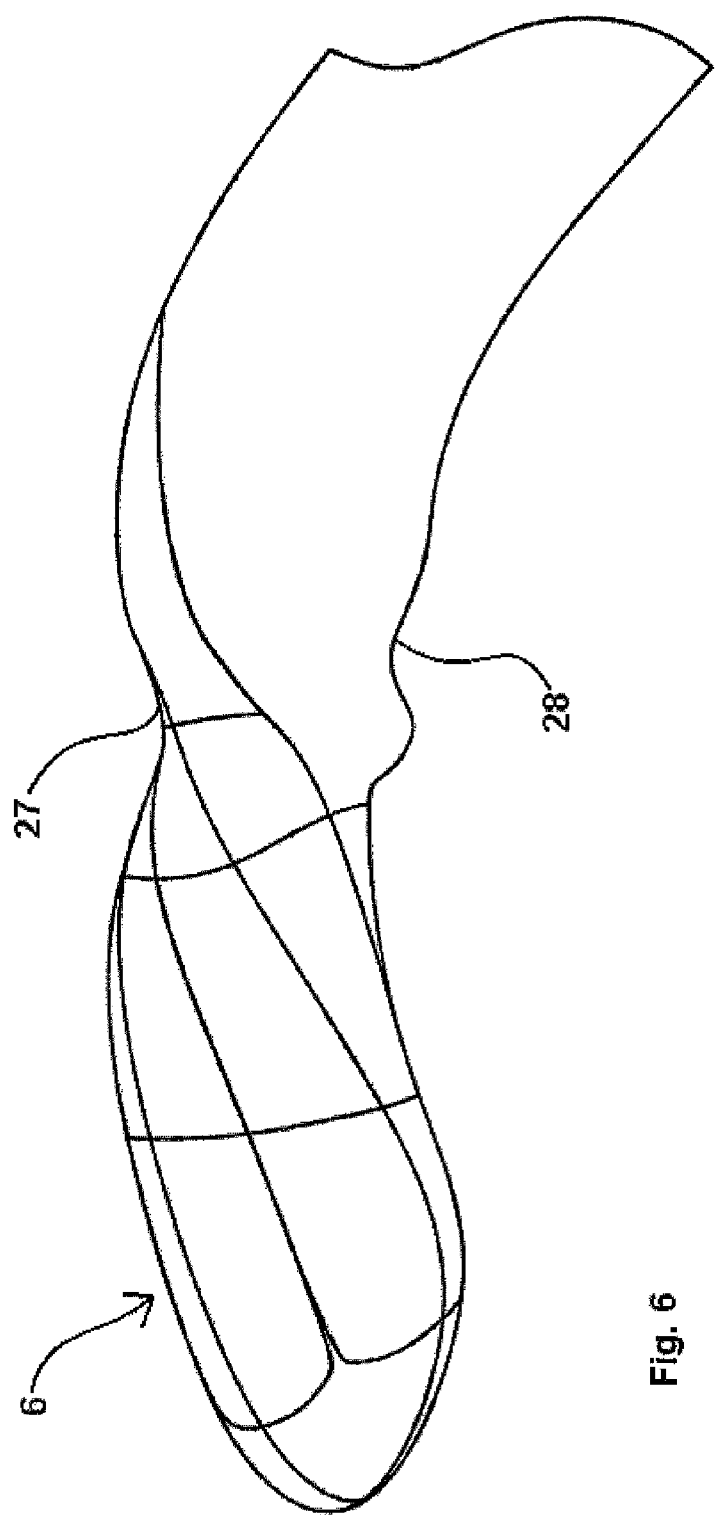
Figure 7:
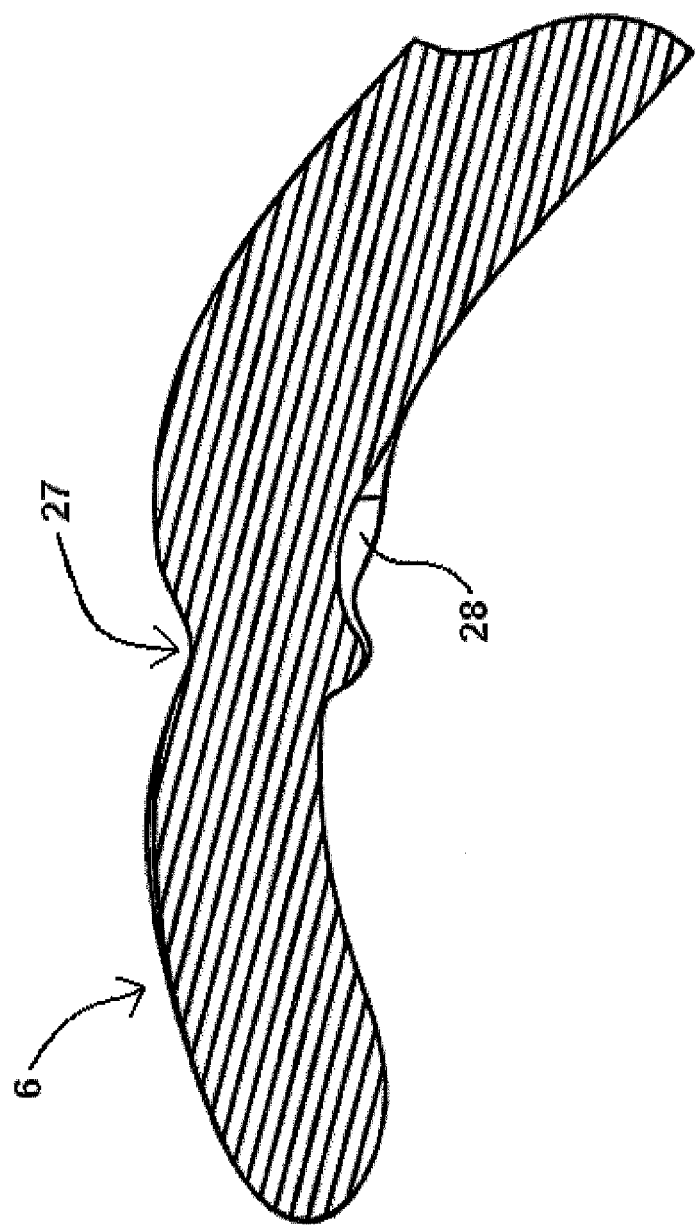
Figure 8:
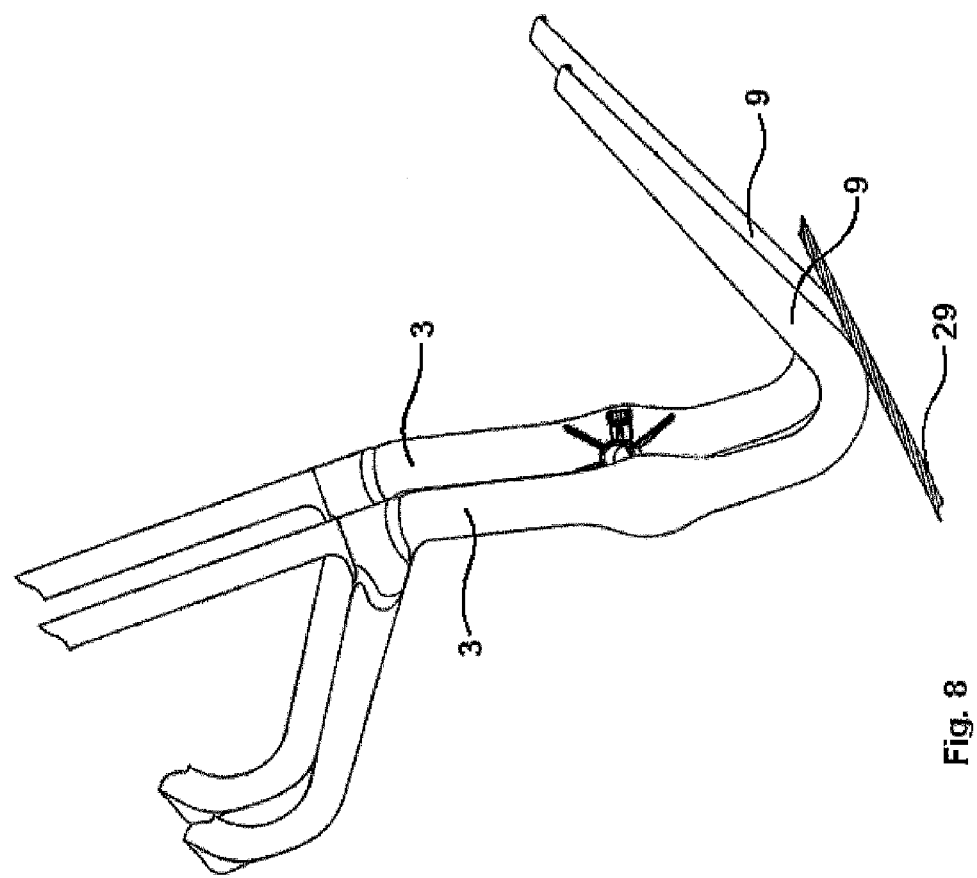
Figure 9:
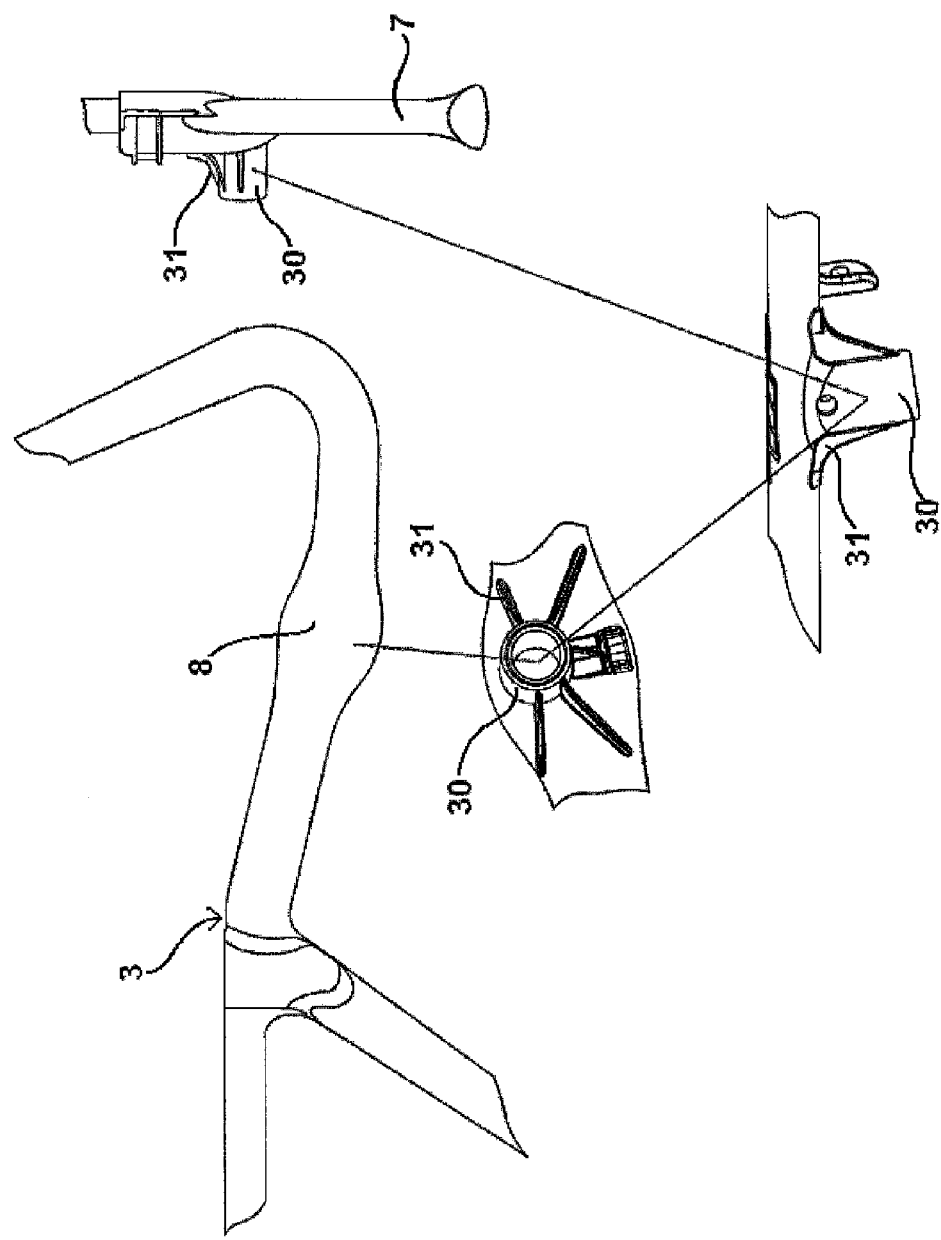
Figure 10:
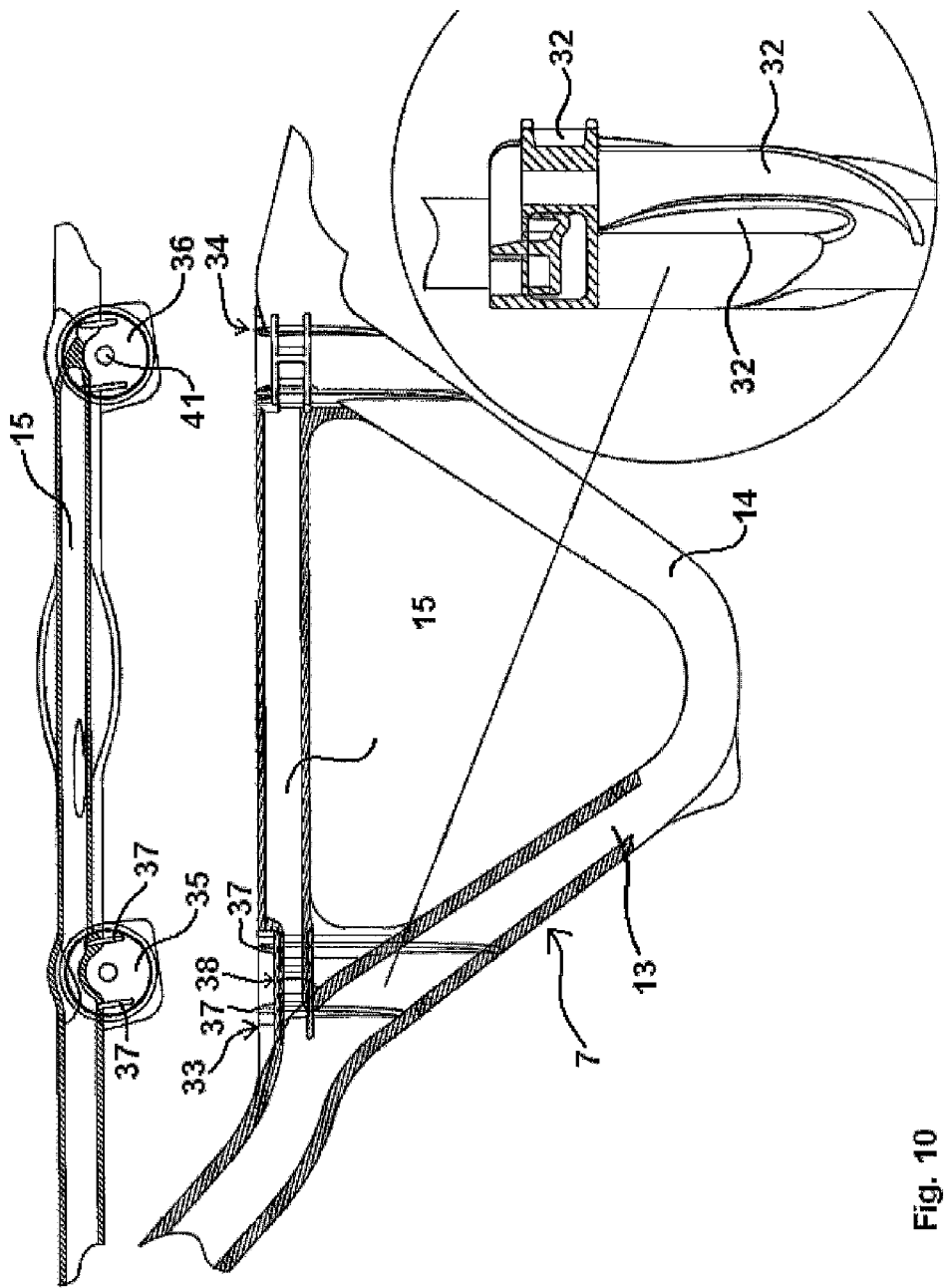
Figure 11:
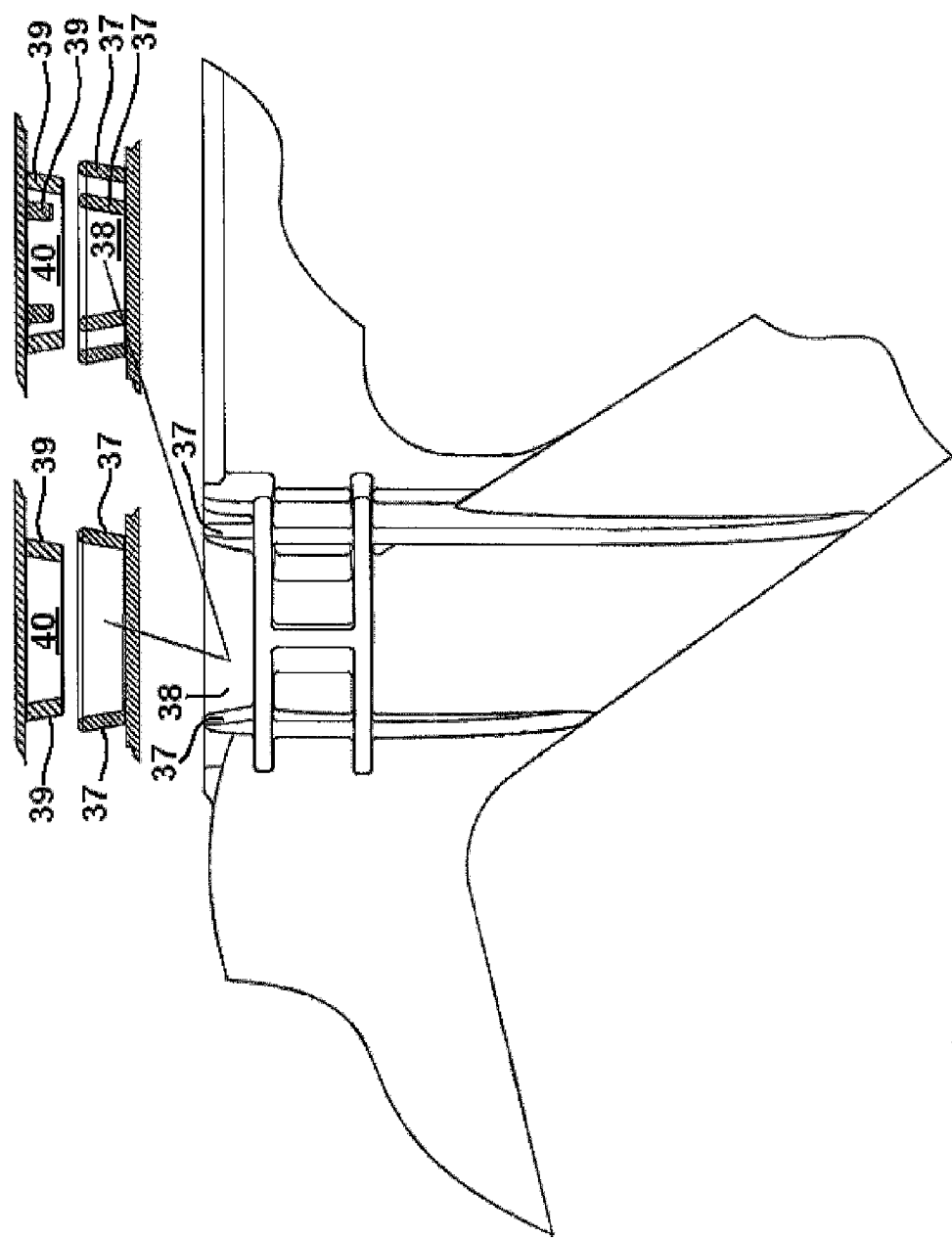
Figure 12:
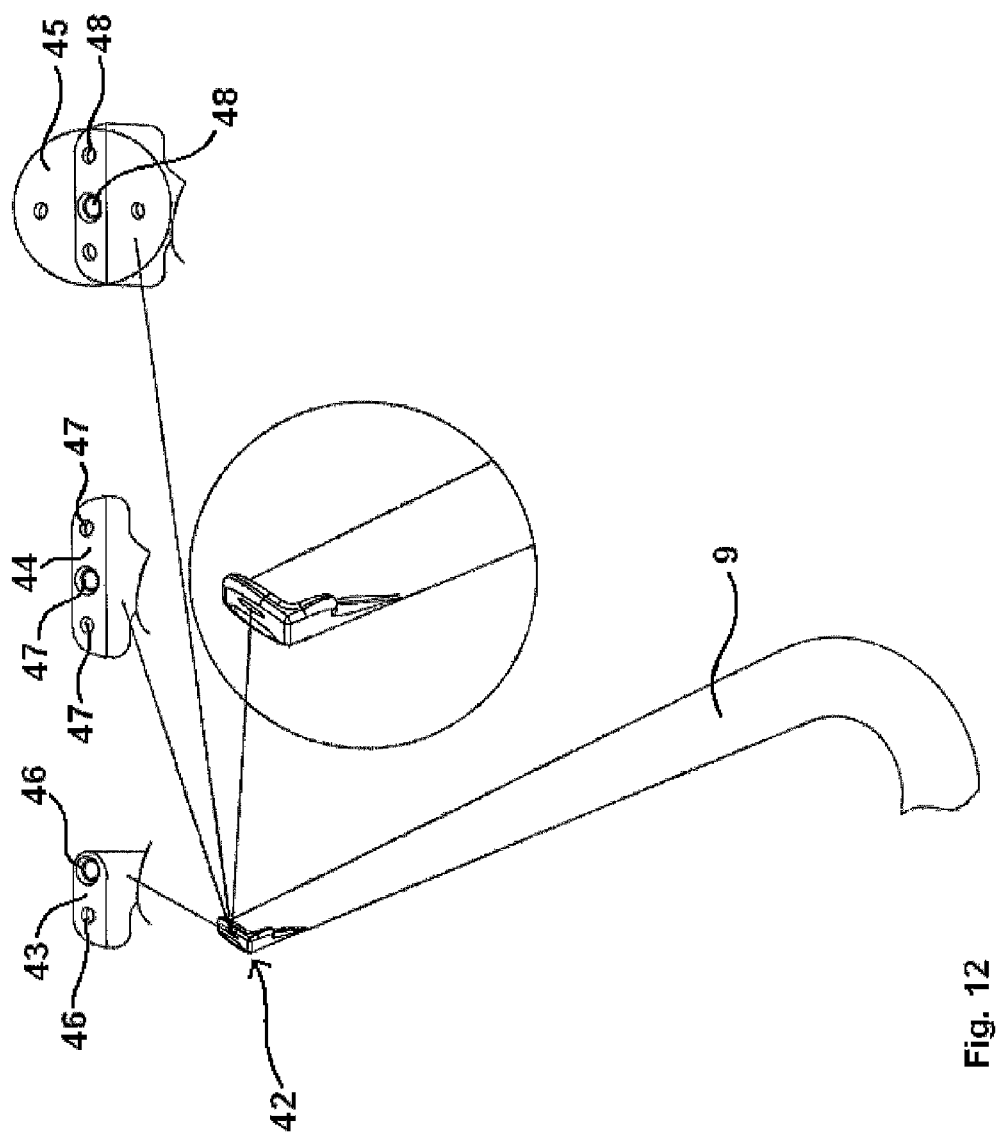
Figure 13:
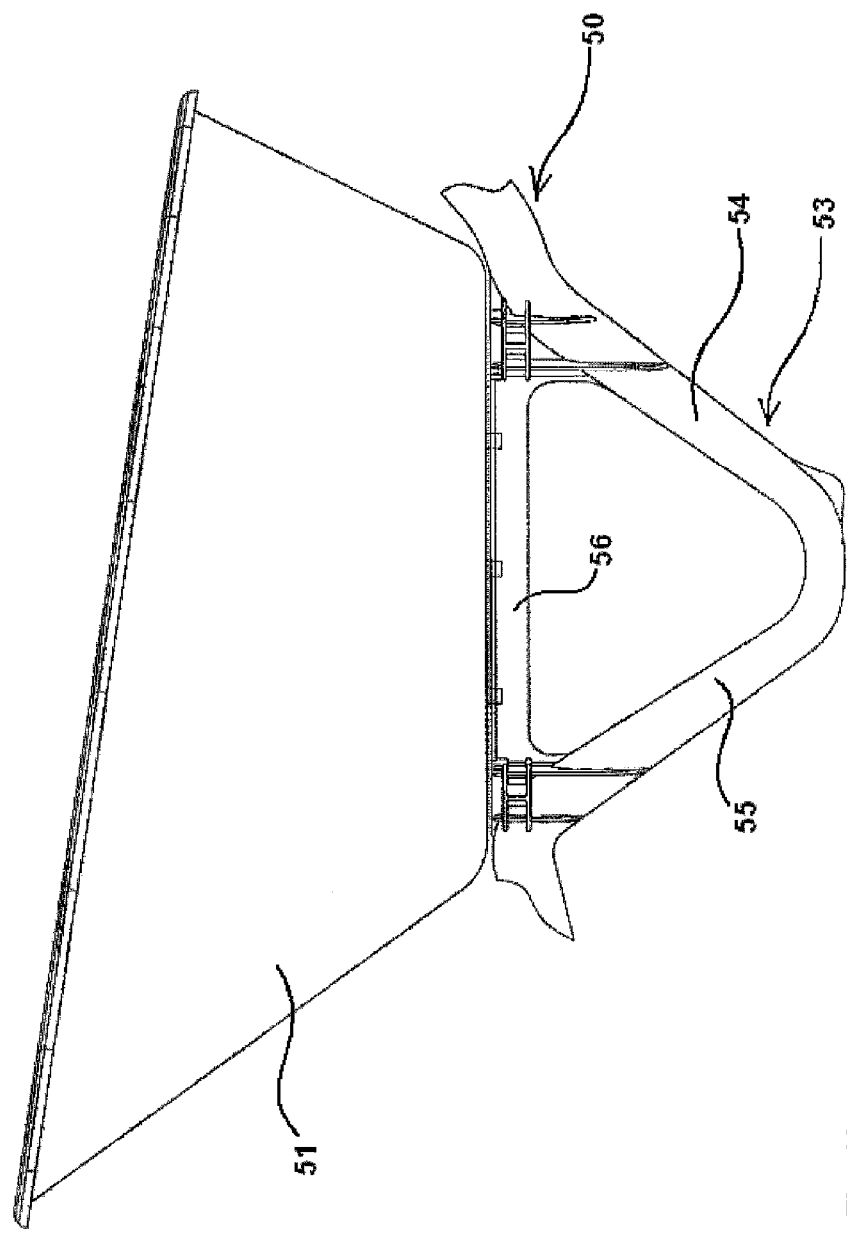
Figure 14:
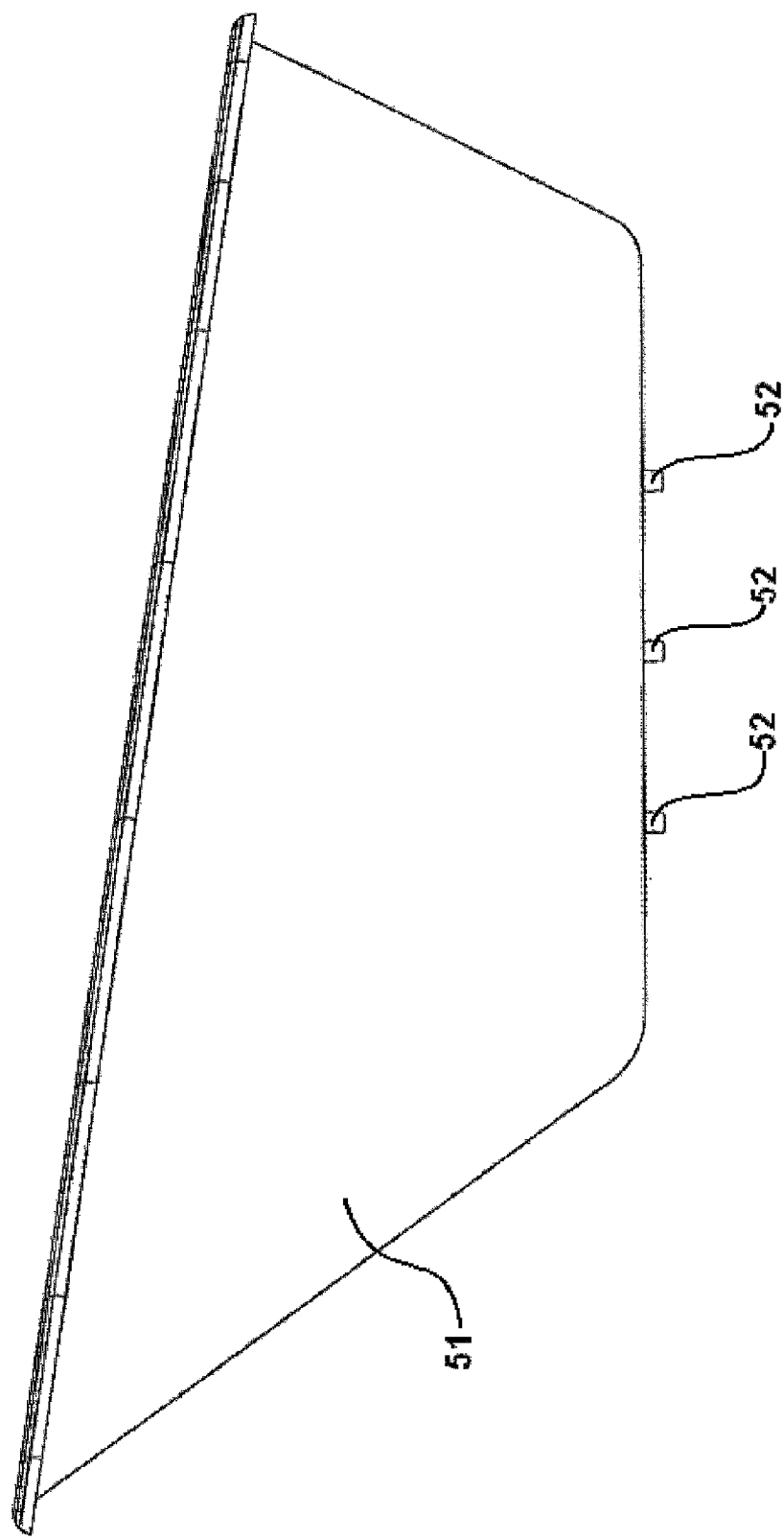
Figure 15:
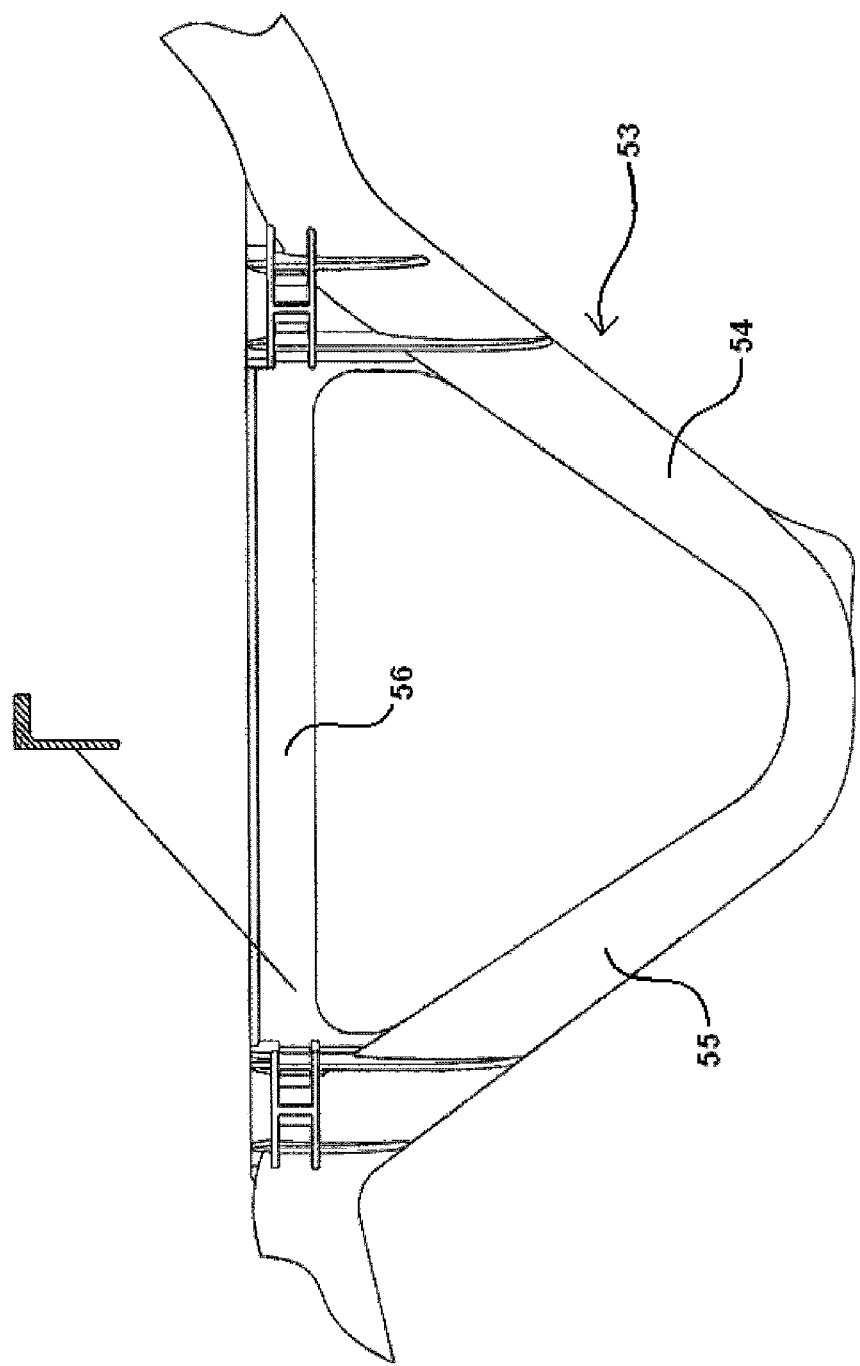
Figure 16:
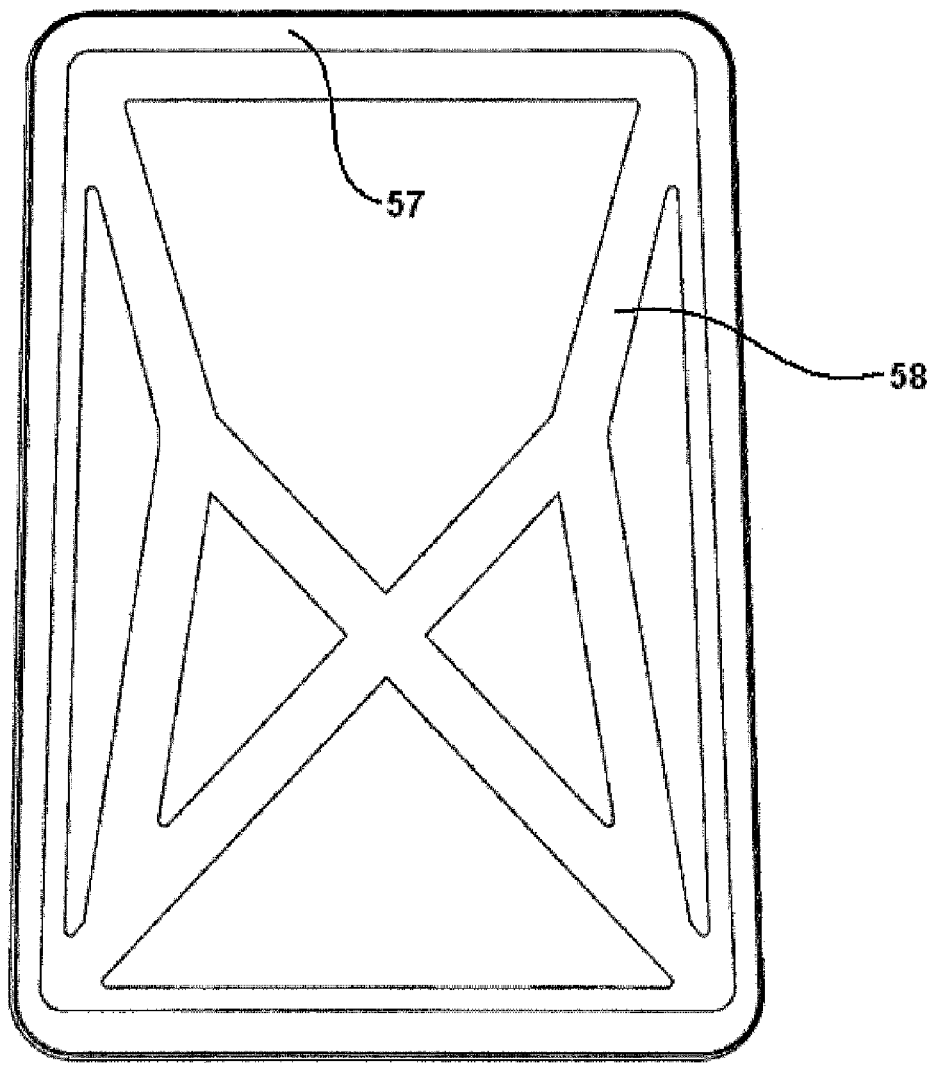
Figure 17:
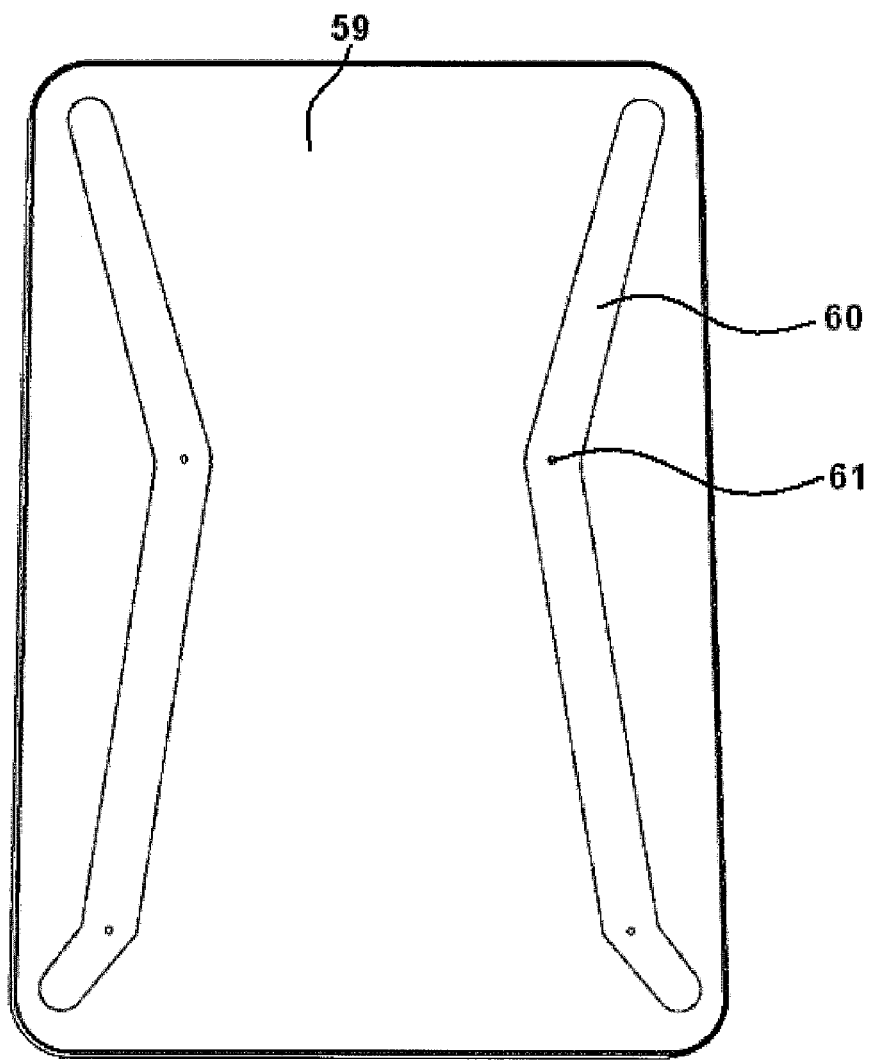
Figure 18:
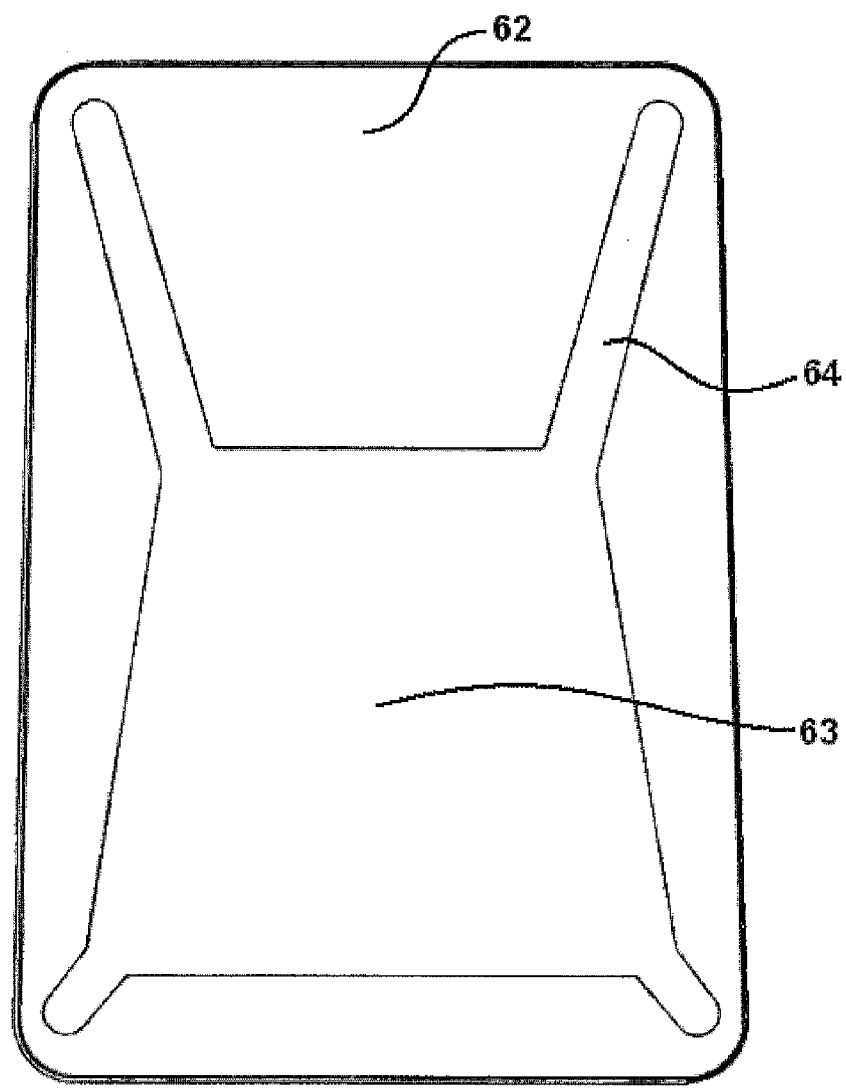
Figure 19:
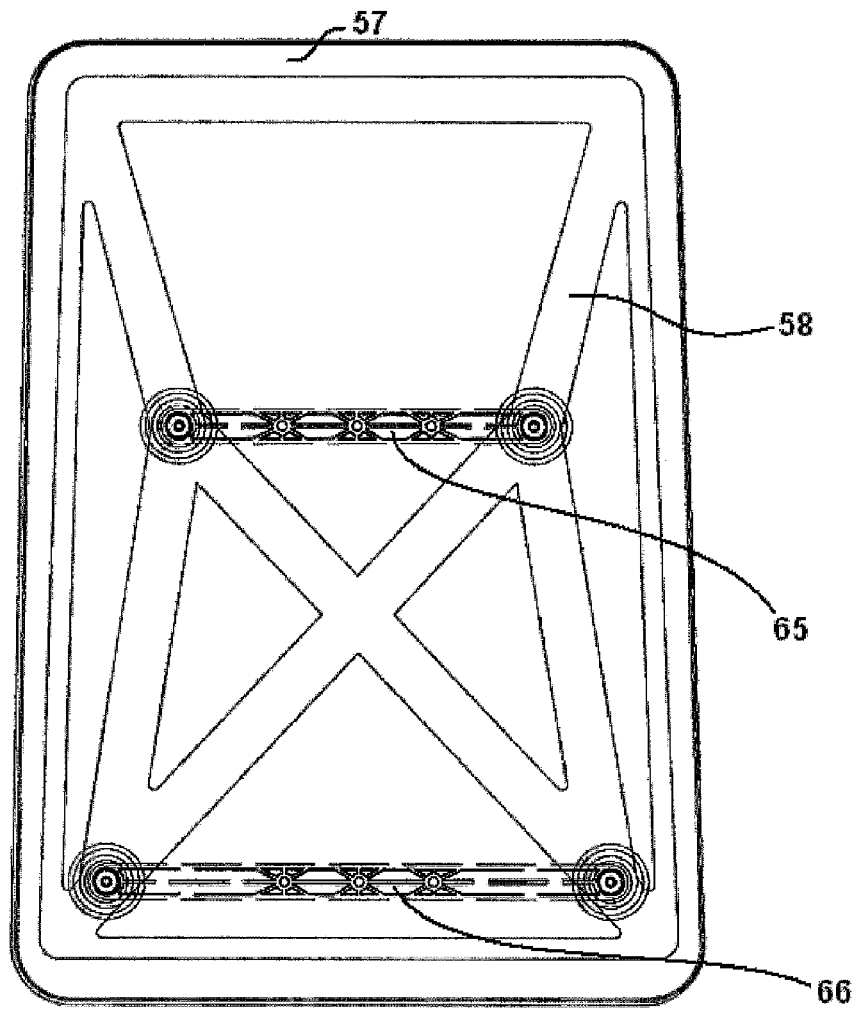
Figure 20:
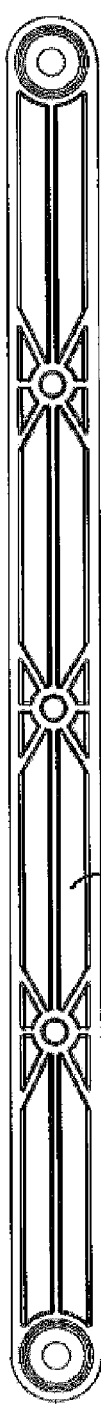
Figure 21:
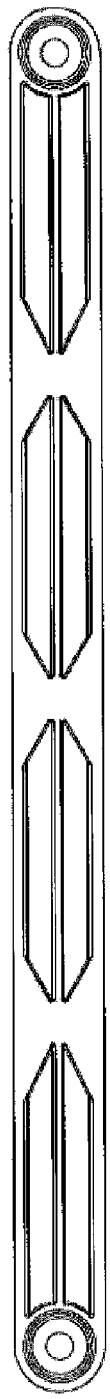
Figure 22:
Figure 23:
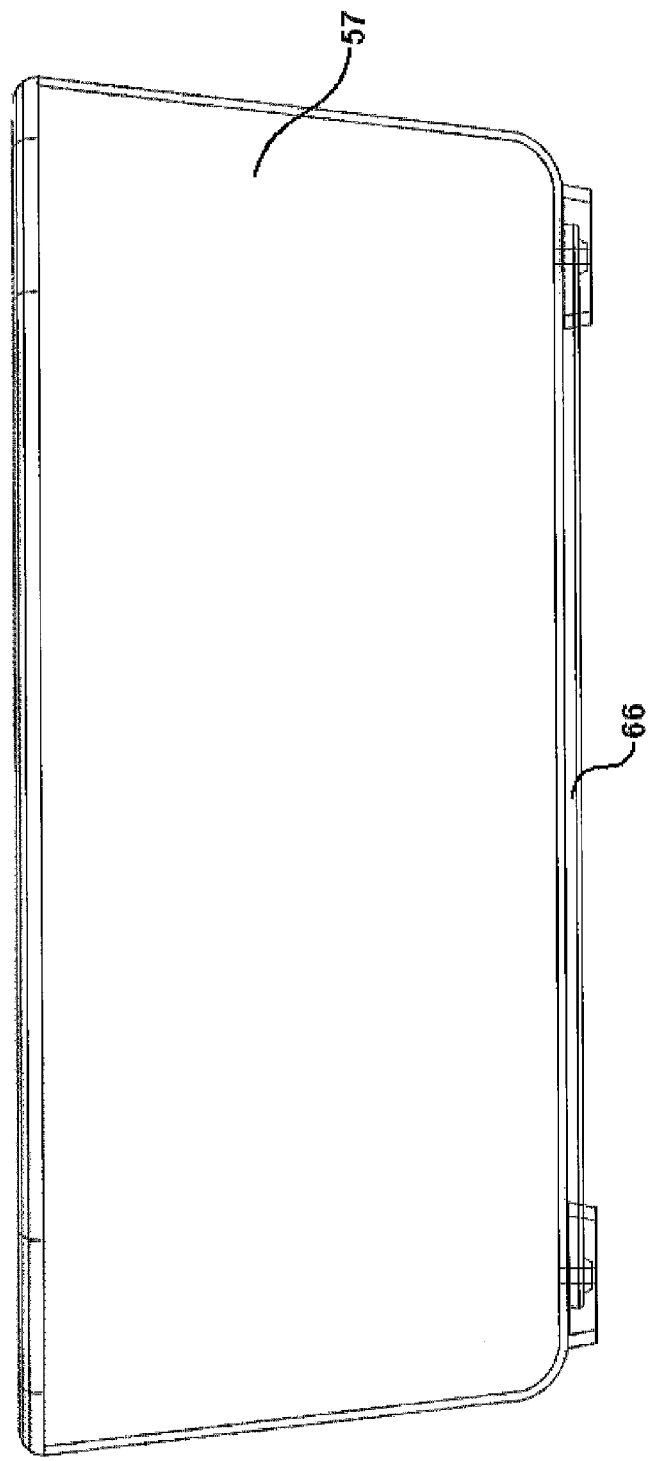
Figure 24:
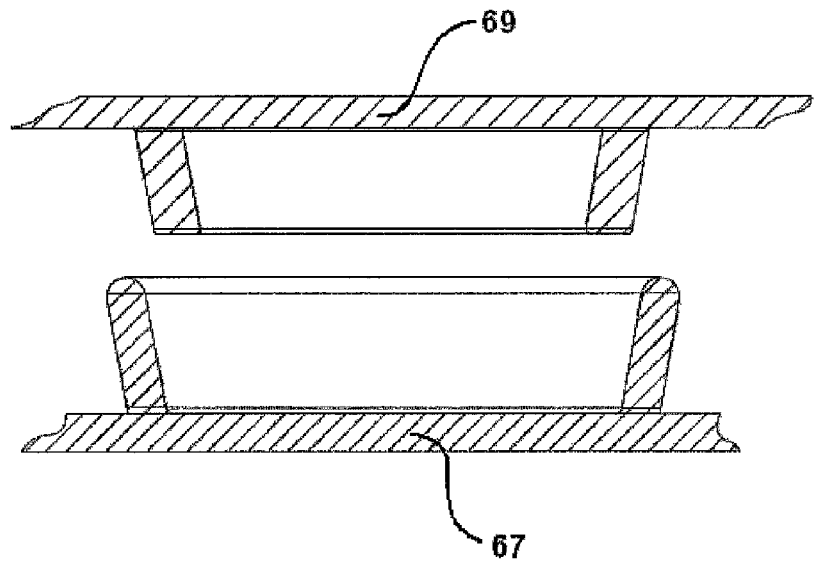
Figure 25:
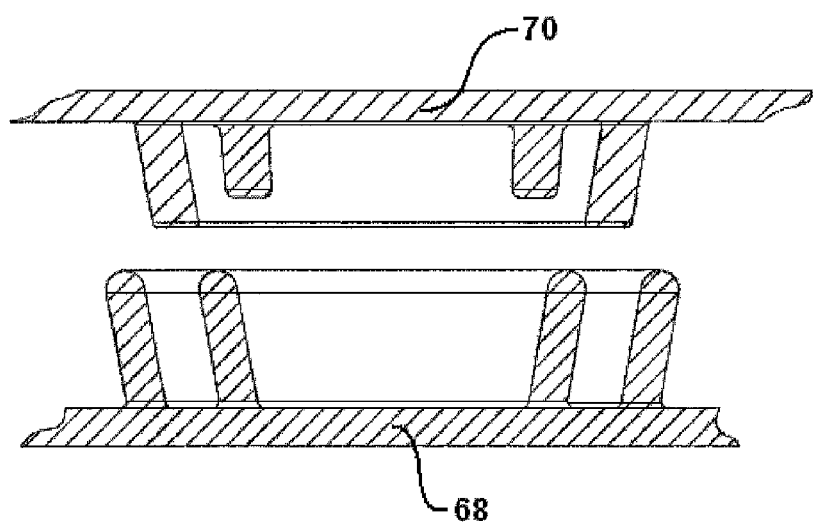

The drawing shows an exemplary embodiment of the wheelbarrow according to the invention. Illustrations:

FIG. 1 First exemplary embodiment of a wheelbarrow in side view,

FIG. 2 Rear part of the wheelbarrow frame as shown in side view in FIG. 1, FIG. 3 Front part of the wheelbarrow frame as shown in side view in FIG. 1, FIG. 4 Section of the wheelbarrow frame with wheel mount and roll-off bar as shown in side view in FIG. 1, FIG. 5 Part of the support of the wheelbarrow frame as shown in FIG. 1, partly in longitudinal section, FIG. 6 Grip of the wheelbarrow as shown in side view in FIG. 1 with contour lines, FIG. 7 Grip as shown in FIG. 6, cross-section view, FIG. 8 Part of the wheelbarrow frame as shown in FIG. 1 in perspective view when rolling off from the surface on the roll-off bars, FIG. 9 Section of the wheel mounts of the wheelbarrow as shown in FIG. 1 in various views, FIG. 10 Wheelbarrow support as shown in FIG. 1 in side view, partly cut away, and in a top view, partly cut away, FIG. 11 Rear connecting device of the wheelbarrow as shown in FIG. 1, FIG. 12 Upper end of the roll-off bar of the wheelbarrow as shown in FIG. 1, FIG. 13 Second exemplary embodiment of a wheelbarrow in side view, with only part of the frame shown, FIG. 14 Load-carrying facility of the wheelbarrow as shown in FIG. 13 in side view, FIG. 15 Support of the wheelbarrow as shown in FIG. 13 in side view, FIG. 16 First exemplary embodiment of a load-carrying device for a wheelbarrow as shown in FIG. 1 or FIG. 13, view from below, FIG. 17 Second exemplary embodiment of a load-carrying device for a wheelbarrow as shown in FIG. 1 or FIG. 13, view from below, FIG. 18 Third exemplary embodiment of a load-carrying device for a wheelbarrow as shown in FIG. 1 or FIG. 13, view from below, FIG. 19 Load-carrying facility as shown in FIG. 16 with additional reinforcing elements in a view from below, FIG. 20 Reinforcing element as shown in FIG. 19, FIG. 21 Second exemplary embodiment of a reinforcing element, FIG. 22 Third exemplary embodiment of a reinforcing element, FIG. 23 Load-carrying facility as shown in FIG. 19 in a front view, FIG. 24 First exemplary embodiment of profiles on the frame and the load-carrying facility of a wheelbarrow as shown in FIG. 1 or FIG. 13, FIG. 25 Second exemplary embodiment of profiles on the frame and the load-carrying facility of a wheelbarrow as shown in FIG. 1 or FIG. 13.

DESCRIPTION OF THE EXEMPLARY EMBODIMENTS

FIG. 1 represents a wheelbarrow with a frame 1 and a load-carrying facility 2 in side view. The load-carrying facility 2 takes the form of a trough-shaped container. The frame 1 exhibits two identical hollow bodies 3 and a wheel 4. Of the two identical hollow bodies, only the hollow body 3 nearer to the viewer is evident in the representation. The other hollow body is concealed by the first hollow body. In FIG. 8, both hollow bodies are at least partly evident. Each of the two hollow bodies 3 exhibits a handle bar 5 with a grip 6, a support 7, a wheel mount 8 and a roll-off bar 9. At positions 10, 11 and 12 the frame 1 is firmly secured to the load-carrying facility 2 by means of fastenings not shown in the drawing. At these positions 10, 11 and 12, the hollow bodies of the frame are equipped with connecting devices. These latter are shown in FIGS. 10, 11 and 12. The connecting devices form a support for the load-carrying facility 2 and exhibit fastenings for securing the load-carrying facility to the frame. The hollow bodies 3 are additionally reinforced in respect of their wall thickness around positions 10 and 11. At position 12, the upper end of the roll-off bar 9 is connected to the load-carrying device 2. Compared to positions 10 and 11, the support surface for the load-carrying facility on the frame is significantly smaller at position 12. The support 7 consists of a V-shaped section with two shanks 13 and 14 and a member 15 connecting the two shanks 13 and 14. The member 15 stabilises the support and in addition serves as the support for the load-carrying facility.

FIG. 2 shows part of the hollow body 3 of the frame with a section of the handle bar 5 and a section of the support 7. The cross-sections 16, 17, 18 and 19 are furthermore represented at various positions on the handle bar and support. It is evident here that the cross-section of the handle bar 5 is circular in one area, and ellipsoidal in another. On the other hand, the cross-section of the member 15 is rectangular. The support 7 exhibits a curvature 20 between the two shanks 13 and 14. A ridge 21 is present at the curvature.

FIG. 3 shows another part of the hollow body 3 of the frame 1 with a section of the support 7, the wheel mount 8 and the roll-off bar 9. Details in longitudinal section are in addition represented. It is evident from this that the wall thickness of the hollow body 3 at the curvature 20 of the support 7 and at the curvature 22 of the roll-off bar 9 is greater on the outward-facing side of the curvature than on the inward-facing side.

FIG. 4 shows part of the hollow body 3 of the frame 1, with a reinforcement 23 made from metal positioned on the curvature 22 of the roll-off bar 9.

FIG. 5 shows the curvature 20 of the support 7 with two different reinforcements. In the upper part of FIG. 5, support 7 is represented in side view. The two details below it show the support at the curvature 20 in a representation rotated through 90°. The version appearing higher up features a plate 24, which is secured to the hollow body 3 at the curvature 20 by means of a screw 25. The version appearing lower down features several ribs 26, which extend downwards on the downward-facing outside of curvature 20 and protrude beyond the adjacent surface of the hollow body 3.

FIGS. 6 and 7 show the grip 6. The grip 6 features a first grip recess 27 for the thumb and a second grip recess 28 for the index finger. The contour lines in FIG. 6 highlight the outward shape of grip 6.

FIG. 8 shows parts of the frame 1 when rolling off from a surface 29 on the roll-off bars 9 of the two hollow bodies 3. For the sake of clarity, the wheel and the load-carrying facility are not represented.

FIG. 9 shows the wheel mount 8 section of the hollow body 3 in side view, with several details. On the side facing the wheel 4, in the section for the wheel mount 8, there is a cylindrical mount 30 for an axle for wheel 4 that is not shown in the drawing. The mount 30 features radiating-pattern reinforcing elements 31.

FIG. 10 shows the support 7 of the wheelbarrow in a side view and in a top view. Parts of the support are shown cut away in both views. At the transition between the shank 13 and the member 15 and between the shank 14 and the member 15, additional contours 32 are provided to reinforce and stabilise this section of the frame. A rear connecting device 33 and a centre connecting device 34 serve to connect and secure the load-carrying device 2 to the frame 1. The rear connecting device is arranged on the side of the support facing the grip and is therefore to the rear in the wheelbarrow's direction of travel. The centre connecting device 34 is located on the side of the support facing the wheel mount. It is located between the rear connecting device 33 and the front connecting device shown in FIG. 12, which faces forward in the wheelbarrow's direction of travel. The load-carrying facility 2 is connected to the frame 1 by the rear and centre connecting device at the positions 10 and 11 marked in FIG. 1. The connecting elements 35 and 36 thus form a support for the load-carrying facility 2. The load-carrying facility can interlock in the two elevations 37 on the connecting elements and the recess 38 between the elevations 37 thanks to the corresponding elevations 39 and recess 40. The latter are represented in FIG. 11. FIG. 11 shows two versions of these. The elevations 37 and 39 and the recess are conically shaped. The circular opening 41 allows an additional fastening, such as a screw, to be introduced and connected to the load-carrying facility.

FIG. 12 shows the upper end of the roll-off bar 9 with the corresponding front connecting device 42. Three versions of the front connecting device are provided, differing according to the size of the support surface 43, 44, 45 for the load-carrying facility and the number of holes 46, 47, 48 for additional fastenings. Thanks to this front connecting device, a connection is established at position 12 between the frame 1 and the load-carrying facility 2.

FIGS. 13 to 15 show a second exemplary embodiment of a wheelbarrow in side view. The wheelbarrow exhibits a frame 50 and a load-carrying facility 51 in the form of a trough. The load carrier 51 is fitted with projections 52 on the side facing the frame 50. The frame 50 exhibits a V-shaped support 53 with two shanks 54 and 55, which form a triangle together with a member 56. Member 56 has an L-shaped cross-section. The section of member 56 facing the load-carrying facility 51 exhibits openings not visible in the drawing, in which the protrusions 52 of the load carrier 51 engage. This engaging of the load-carrying facility 51 in the frame 50 stabilises the wheelbarrow by receiving the torsion.

Various load-carrying facilities taking the form of a trough are shown in a view from below in FIGS. 16, 17 and 18. The underside of the load-carrying facilities identifiable in the representation faces the frame when mounted on a frame. All three load-carrying facilities shown in the FIGS. 16, 17 and 18 exhibit reinforcing elements on their underside, which perform the function of stiffening the load-carrying facility. The reinforcing elements are embedded in the base of the load-carrying facility. They form a recognisable structure on the underside of the load-carrying facility. They consist of an additional accumulation of material or of further components that are embedded in the plastic melt during the manufacture of the load-carrying facility. With the same line as the reinforcing elements, stiffening elements taking the form of hollow channels can also be arranged on the load-carrying facility. On the load-carrying facility 57 shown in FIG. 16, the reinforcing elements 58 run parallel to the edges of the load-carrying facility and cross over each other at the base. On the load-carrying facility 59 shown in FIG. 17, the reinforcing elements 60 run at least in part parallel to the edges of the load-carrying facility. However, they do not cross over each other. At the recesses 61, the load-carrying facility 59 is connected to a frame not shown in FIG. 17. On the load-carrying facility 62 shown in FIG. 18, a large-area reinforcing element 63 and four longitudinal reinforcing elements 64 run parallel to the edges of the load-carrying facility.

In FIG. 19 the load-carrying facility 57 is equipped with additional reinforcing elements 65 and 66 taking the form of profiles. These reinforcing elements 65, 66 are loose. They are preferably connected to the wheelbarrow when the load-carrying facility 57 is arranged on a frame. To that end the reinforcing elements 65, 66 exhibit recesses 67, which are aligned with recesses in the load-carrying facility. The load-carrying facility is connected to a frame via these recesses.

FIGS. 20, 21, 22 show various profiles that are arranged on the underside of a load-carrying facility. The profile in FIG. 20 corresponds to the reinforcing element in FIG. 19. The profiles shown in FIGS. 21 and 22 exhibit a different structure.

FIG. 23 shows the load-carrying facility 57 with the reinforcing element 66 in a front view.

FIGS. 24 and 25 show various profiles of a frame 67, 68 and a load-carrying facility 69, 70 that interlock and act as a bearing with counterbearing. This form of mounting the load-carrying facility on the frame serves to stiffen, reinforce and stabilise the wheelbarrow.

All features of the invention either individually or in any given combination can be essential to the invention both.

REFERENCE NUMBERS

1 Frame
2 Load-carrying facility
3 Hollow body
4 Wheel
5 Handle bar
6 Grip
7 Support
8 Wheel mount
9 Roll-off bar
10 Position of fixed connection between frame and load-carrying facility
11 Position of fixed connection between frame and load-carrying facility
12 Position of fixed connection between frame and load-carrying facility
13 Support shank
14 Support shank
15 Support member
16 Cross-section of handle bar at a first position
17 Cross-section of handle bar at a second position
18 Cross-section of handle bar at a third position
19 Cross-section of member
20 Curvature of support
21 Ridge
22 Curvature of roll-off bar
23 Reinforcement of curvature of roll-off bar
24 Plate
25 Screw
26 Rib
27 First grip recess
28 Second grip recess
29 Ground surface
30 Mount for axle for wheel
31 Reinforcing element
32 Contour
33 Rear connecting device
34 Centre connecting device
35 Connecting element
36 Connecting element
37 Elevation of connecting device
38 Recess of connecting device
39 Elevation of load-carrying facility
40 Recess of load-carrying facility
41 Opening
42 Front connecting device
43 Support surface
44 Support surface
45 Support surface
46 Hole
47 Hole
48 Hole
49
50 Frame
51 Load-carrying facility
52 Protrusion
53 Support
54 Shank
55 Shank
56 Member
57 Load-carrying facility
58 Reinforcing element
59 Load-carrying facility
60 Reinforcing element
61 Recess
62 Load-carrying facility
63 Reinforcing element
64 Reinforcing element
65 Reinforcing element
66 Reinforcing element
67 Frame
68 Frame
69 Load-carrying facility
70 Load-carrying facility

The invention claimed is:

1. A wheelbarrow comprising
a frame formed from at least one hollow body,
at least one pivot-mounted wheel on the frame,
at least two handle bars and grips for the frame located on the handle bars,
at least two supports for the frame, on which the wheelbarrow is supported in a rest position,
a load-carrying facility located on the frame, the load-carrying facility accomplished to carry loads,
differing cross-sections of the hollow body in various sections of the frame, and
an oval external shape of the hollow body departing from a circular shape for a cross-section of at least one straight section of the frame,
wherein the hollow body has wall thicknesses differing in various straight sections of the frame.

2. The wheelbarrow according to claim 1, wherein the oval shape exhibits greater elongation in a vertical direction than in a horizontal direction in the at least one straight section.

3. The wheelbarrow according to claim 1, wherein the frame comprises two identical hollow bodies each with a handle bar with grip, a support and a wheel mount on which the wheel is pivot-mounted.

4. The wheelbarrow according to claim 3, wherein at an opposite end to the handle bar each of the two identical hollow bodies comprises a front connecting device at which the load-carrying facility is connected to the frame, and wherein each of the hollow bodies exhibits a section shaped as a roll-off bar between the wheel mount and the front connecting device.

5. The wheelbarrow according to claim 3, wherein each of the two identical hollow sections comprises a rear connecting device on a support or between the handle bar and the support, at which the load-carrying facility is connected to the frame.

6. The wheelbarrow according to claim 4, wherein each of the two identical hollow sections comprises a center connecting device on the support or between the support and the wheel mount, at which the load-carrying facility is connected to the frame.

7. The wheelbarrow according to claim 1, wherein the supports comprise V-shaped sections of the at least one hollow body having first and second shanks, and wherein the first and second shanks of each V-shaped section are connected to each other by a member forming a triangle together with the shanks.

8. The wheelbarrow according to claim 1, wherein the grips comprise sections of the at least one hollow body in an area of the handle bars, and wherein the grips feature at least one recess selected from the group consisting of a grip recess for a thumb and a grip recess for a further finger.

9. The wheelbarrow according to claim 1, wherein the load-carrying facility comprises at least one elongate cavity forming a stiffening element.

10. A wheelbarrow comprising
a frame formed from at least one hollow body,
at least one pivot-mounted wheel on the frame,
at least two handle bars and grips for the frame located on the handle bars,
at least two supports for the frame, on which the wheelbarrow is supported in a rest position,
a load-carrying facility located on the frame, the load-carrying facility accomplished to carry loads,
differing cross-sections of the hollow body in various sections of the frame, and
an oval external shape of the hollow body departing from a circular shape for a cross-section of at least one straight section of the frame,
wherein the hollow body of the frame exhibits a curvature in at least one section, and wherein the hollow body in an inward-facing part of the curvature has a first wall thickness smaller than a second wall thickness in an outward-facing part.

11. A wheelbarrow comprising
a frame formed from at least one hollow body,
at least one pivot-mounted wheel on the frame,
at least two handle bars and grips for the frame located on the handle bars,
at least two supports for the frame, on which the wheelbarrow is supported in a rest position,
a load-carrying facility located on the frame, the load-carrying facility accomplished to carry loads,
differing cross-sections of the hollow body in various sections of the frame, and
an oval external shape of the hollow body departing from a circular shape for a cross-section of at least one straight section of the frame,
wherein the hollow body of the frame exhibits a curvature in the section of the supports and wherein the hollow body on an outward-facing outer side of the curvature and downward facing outer side in the rest position of the wheelbarrow comprises several ribs, which protrude above a surface surrounding the ribs.

12. A wheelbarrow comprising
a frame formed from at least one hollow body,
at least one pivot-mounted wheel on the frame,
at least two handle bars and grips for the frame located on the handle bars,
at least two supports for the frame, on which the wheelbarrow is supported in a rest position,
a load-carrying facility located on the frame, the load-carrying facility accomplished to carry loads,
differing cross-sections of the hollow body in various sections of the frame, and
an oval external shape of the hollow body departing from a circular shape for a cross-section of at least one straight section of the frame,
wherein the frame comprises two identical hollow bodies each with a handle bar with grip, a support and a wheel mount on which the wheel is pivot-mounted,
wherein at an opposite end to the handle bar each of the two identical hollow bodies comprises a front connecting device at which the load-carrying facility is connected to the frame,
wherein each of the hollow bodies exhibits a section shaped as a roll-off bar between the wheel mount and the front connecting device,
wherein the connecting device comprises a section of the hollow body, and
wherein in said section the hollow body exhibits a larger support surface for the load-carrying facility than other sections of the hollow body.

13. The wheelbarrow according to claim 12, wherein the connecting device comprises at least one connecting device element selected from the group consisting of elevations and recesses on a side facing the load-carrying facility, and wherein the load-carrying facility comprises at least one load-carrying facility element selected from the group consisting of elevations and recesses that engage in the at least one connecting device element in a section facing the connecting device.

14. The wheelbarrow according to claim 13, wherein the at least one connecting device element and the at least one load-carrying facility element are conical.

15. A wheelbarrow comprising
a frame formed from at least one hollow body,
at least one pivot-mounted wheel on the frame,
at least two handle bars and grips for the frame located on the handle bars,
at least two supports for the frame, on which the wheelbarrow is supported in a rest position,
a load-carrying facility located on the frame, the load-carrying facility accomplished to carry loads,
differing cross-sections of the hollow body in various sections of the frame, and
an oval external shape of the hollow body departing from a circular shape for a cross-section of at least one straight section of the frame,
wherein the frame comprises two identical hollow bodies each with a handle bar with grip, a support and a wheel mount on which the wheel is pivot-mounted,
wherein the wheel mount comprises a section of the at least one hollow body having a cross-section larger than cross-sections of adjacent sections and comprising a mount for a fixed or pivoting axle for the wheel.

16. The wheelbarrow according to claim 15, wherein the section for the wheel mount comprises reinforcing elements.

* * * * *